United States Patent [19]

Smith

[11] 4,191,400
[45] Mar. 4, 1980

[54] SWIVELING ANCHOR FOR OCCUPANT RESTRAINT SYSTEM

[75] Inventor: Edward J. Smith, Mantachie, Miss.

[73] Assignee: REPA Feinstanzwerk GmbH, Fed. Rep. of Germany

[21] Appl. No.: 781,194

[22] Filed: Mar. 25, 1977

[51] Int. Cl.² ............................................. B60R 21/10
[52] U.S. Cl. .................... 280/808; 297/483; 403/141
[58] Field of Search ............ 280/747, 744, 745; 180/82 C; 297/388, 389; 24/265 AL, 163 R; 403/141, 142

[56] References Cited

U.S. PATENT DOCUMENTS

| 3,236,540 | 2/1966 | Berton et al. ....................... 280/747 |
| 3,298,739 | 1/1967 | Scruggs ............................... 280/747 |
| 3,440,602 | 4/1969 | Frig ................................... 280/744 |
| 3,554,577 | 1/1971 | Hane ................................... 280/747 |
| 3,618,975 | 11/1971 | Bombach ............................. 280/747 |
| 3,877,114 | 4/1975 | Silen .............................. 280/744 X |
| 3,994,513 | 11/1976 | Courtis et al. ..................... 280/747 |
| 4,005,904 | 2/1977 | Weman ............................... 280/747 |

FOREIGN PATENT DOCUMENTS

| 215229 | 10/1960 | Austria ..................................... 403/141 |
| 2428814 | 1/1976 | Fed. Rep. of Germany ........... 280/744 |

Primary Examiner—James L. Rowland

[57] ABSTRACT

An improved anchor for the upper portion of a shoulder harness belt in a vehicle restraint system. An anchor member having a substantial force transmitting relationship with the shoulder harness belt, preferably through a webbing relay, has a certain degree of universal type movement, and therefore allows the anchor member and the webbing relay to make appropriate movements to follow the many odd angles and twists which the webbing relay may be subjected to. The anchorage is further designed to transmit high forces between the webbing relay and the frame of the vehicle.

1 Claim, 3 Drawing Figures

SWIVELING ANCHOR FOR OCCUPANT RESTRAINT SYSTEM

BACKGROUND OF THE INVENTION

This application relates generally to an anchorage for use with a vehicle restraint system, and particularly to an anchorage for use with a restraint system of the type which includes a shoulder harness disposed across the chest of a vehicle occupant.

There are numerous types of vehicle restraint systems in which at least a portion of the restraint system includes a shoulder harness extending across the chest of a vehicle occupant. One such system in commercial usage includes a three-point system where a shoulder harness and lap belt are formed by a single loop of belt extending through a connection member which can be releasably attached to the lower portion of the frame of the vehicle adjacent one side of the occupant's seat. In such a system a portion of the lap belt is also connected to a portion of the vehicle frame adjacent the lower portion of the frame adjacent the other side of the occupant's seat. The upper end of the diagonal shoulder harness is either connected to the vehicle frame at a point approximately adjacent the shoulder height of the occupant, or it extends through a webbing relay at approximately the shoulder height of the occupant and then extends generally downwardly behind the seat for attachment to the lower portion of the vehicle frame at a point generally rearwardly of the vehicle seat. In either instance, the upper end of the diagonal shoulder harness is in force transmitting relationship with the portion of the vehicle frame approximately adjacent the shoulder height of the occupant. Therefore, in either instance an anchor point is established between the restraint system and the vehicle frame at approximately the height of the vehicle occupant.

In conventional three-point systems the anchor point is generally formed by an anchor bolt which is fixed to the vehicle frame, and a platelike metal member which is pivotally mounted with respect to the axis of the anchor bolt. Either the belt or the webbing relay is connected in force transmitting relationship with the platelike metal member. Movement of the platelike metal member generally occurs in a single plane normal to the axis of the anchor bolt.

Certain of the foregoing types of restraint systems also include a retractor for automatically tensioning the belt about the occupant, and for rewinding a selected portion of the belt when the system is not in use.

In a shoulder harness system it is most desirable that the shoulder harness belt lays flat against the chest of the vehicle occupant. However, due to the complex twisting forces which the belt may be subjected to, as the occupant moves, the shoulder harness belt may become inconvenient or uncomfortable to the occupant. As is well known to those of ordinary skill in this art, an uncomfortable restraint system presents a real problem because it discourages vehicle occupants from using them. Moreover, in systems in which a retractor is used the complex twisting of the belt relative to the webbing relay may also interfere with retractor performance by creating excessive friction between the belt and the webbing relay. Additionally, a belt in a twisted condition may not be as physiologically safe as a belt which remains flat against the chest of the wearer.

In U.S. Pat. No. 3,820,815, there is disclosed a device for connecting a vehicle belt to the floor of the vehicle, and which (at FIGS. 6 and 7) relates to a belt mounting having motion in various planes. The structure of this disclosure, though, is considerably different from that of the present invention.

SUMMARY OF THE INVENTION

The present invention relates generally to an improved anchorage design, and particularly to an anchorage design which has specific advantages when used to support a member such as a webbing relay in a three-point restraint system. The present invention provides an anchorage in which an anchor member having a substantial force transmitting relationship with the webbing relay has a certain degree of universal type movement, and therefore allows the anchor member and the webbing relay to make appropriate movements to follow the many odd angles and twists which the webbing relay may be subjected to.

Moreover, the present invention further provides an anchorage construction in which movement of the anchor member is provided in such a manner that the required strength of the anchorage is not believed to be compromised.

Thus, the principal object of the invention is to provide a new and improved belt anchorage which allows universal type movement of a force transmitting anchor member.

Another important object of the invention is to provide a belt anchorage in which an anchor member is adapted for universal movement to accommodate the odd angles and twists which the belt may be subjected to, and yet in a manner which is capable of transmitting substantial force to the frame of the vehicle.

It is a further object of the invention to provide an anchor which is intended to maintain a shoulder harness belt substantially flat against the chest of a vehicle occupant in response to a certain degree of complex twisting movements on the part of the occupant.

BRIEF DESCRIPTION OF THE DRAWINGS

The further objects and advantages of this invention will become further apparent from the following detailed description taken with reference to the accompanying drawings wherein.

DETAILED DESCRIPTION OF THE PREFERRED EMBODIMENT

Figure 1:
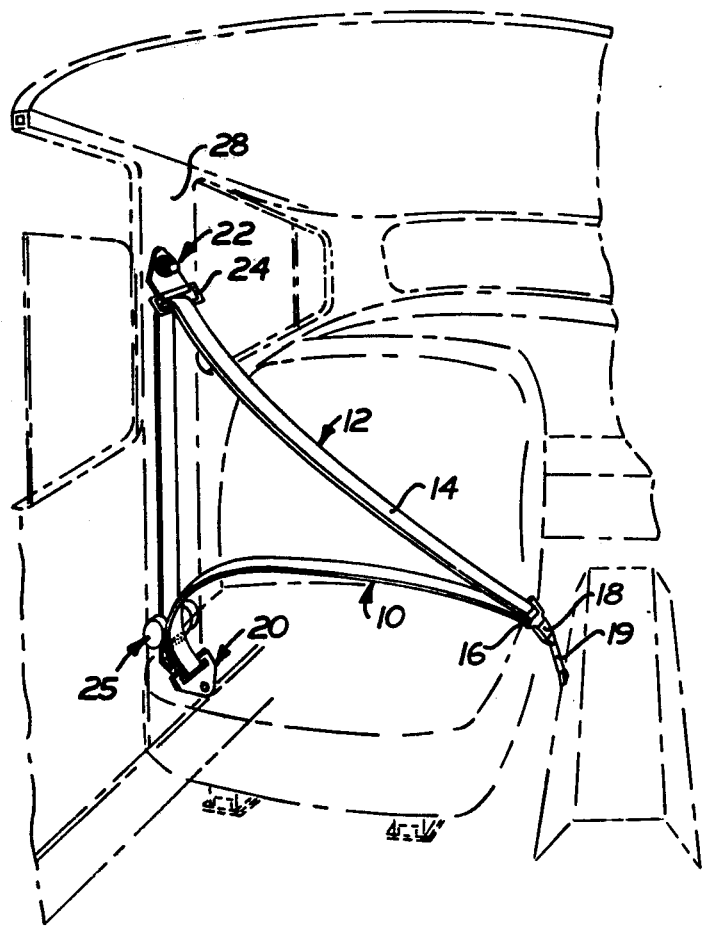
FIG. 1 is a pictorial representation of an automobile restraint system employing the principles of the present invention.

FIG. 1 illustrates generally the disposition of a three point restraint system employing the principles of the present invention. The restraint system generally includes a combined lap belt 10 and shoulder harness 12 formed by a single length of belt 14 which passes through a connection member 16 of known construction. The position of the connection member 16 is adjustable in a known manner with respect to the length of the belt. The connection member 16 is designed for releasable engagement with another connection member 18 of known construction, and connection member 18 is fixedly attached to the vehicle frame (through stem 19) at a point adjacent one end of the occupant's seat.

The other end of the lap belt 10 is connected with an anchorage 20 of conventional design and disposed in force transmitting relationship with the lower portion of the vehicle frame on the other end of the occupant's seat from connection member 18. The upper end of the shoulder harness 12 extends through a webbing relay 24 forming part of an upper anchorage 22 and then extends downwardly to a point adjacent anchorage 20 where it is secured to a retractor 25 of known design.

In the illustrated embodiment, the upper anchorage (i.e. the anchorage which transmits forces from the upper portion of the shoulder harness to the vehicle frame) shown generally at 22 is constructed in accordance with the principles of the present invention. The upper anchorage 22 includes a webbing relay 24 formed as a loop of metal. The portion of the belt which extends through the webbing relay 24 is in force transmitting relation therewith when the occupant (or the retractor 25) applies a force to the belt. According to the principles of the present invention force transmitted to the webbing relay 24 also transmits force to the upper frame of the vehicle.

The anchorage according to the preferred embodiment of this invention includes a threaded bolt 26 connected in fixed relationship with a portion of the vehicle B-frame 28 (a vertically extending frame member). The height of bolt 26, and the location of the bolt 26 lengthwise of the vehicle are preferably determined in the most physiologically correct position for most vehicle occupants. The bolt 26 is therefore connected in force transmitting relationship with the vehicle frame at the selected location.

A bushing member 30 having a generally spherically shaped outer surface 31 is fixedly connected to the bolt 26. The bushing member 30 is preferably a lubricant-bearing member formed of sintered metal, or a member which is molded from a low friction plastic material. In either case the bushing member 30 is secured to the bolt 26 in any suitable manner, such as by press fitting, for example. If desired, a spacer member 35 may be provided between the bushing member 30 and the vehicle B-frame 28.

An anchor member 32 includes a bearing portion 33 which engages the bushing member 30 in such a manner that the anchor member 32 has universal movement with respect to the bushing member 30. The anchor member includes a sheet of metal 34 which is bent back on itself to form first and second metal sheet portions 36, 38. Metal sheet portions 36, 38 have generally contiguous inner surfaces 40, 42 and generally spaced outer surfaces 44, 46.

Figure 3:
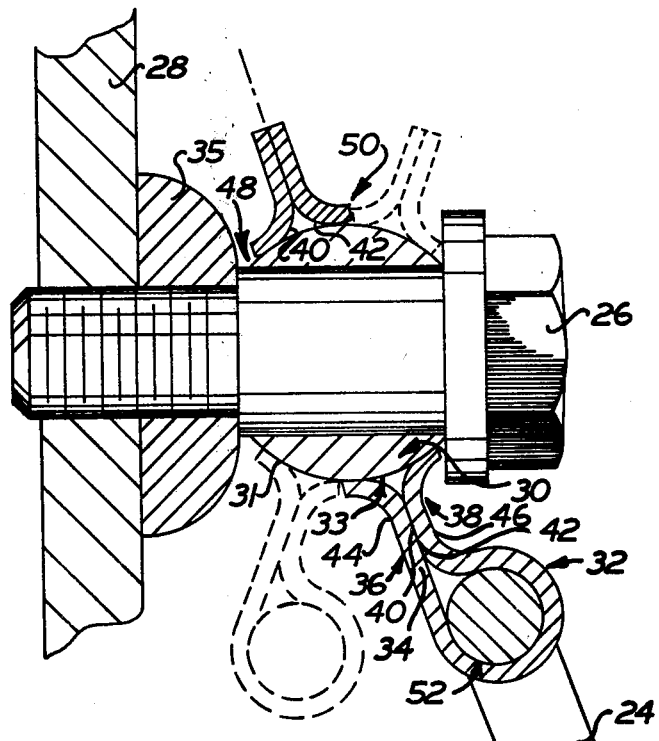
FIG. 3 is a side view of an anchorage system similar to that of FIG. 2, with portions of the vehicle frame and the anchorage shown in section.
Figure 2:
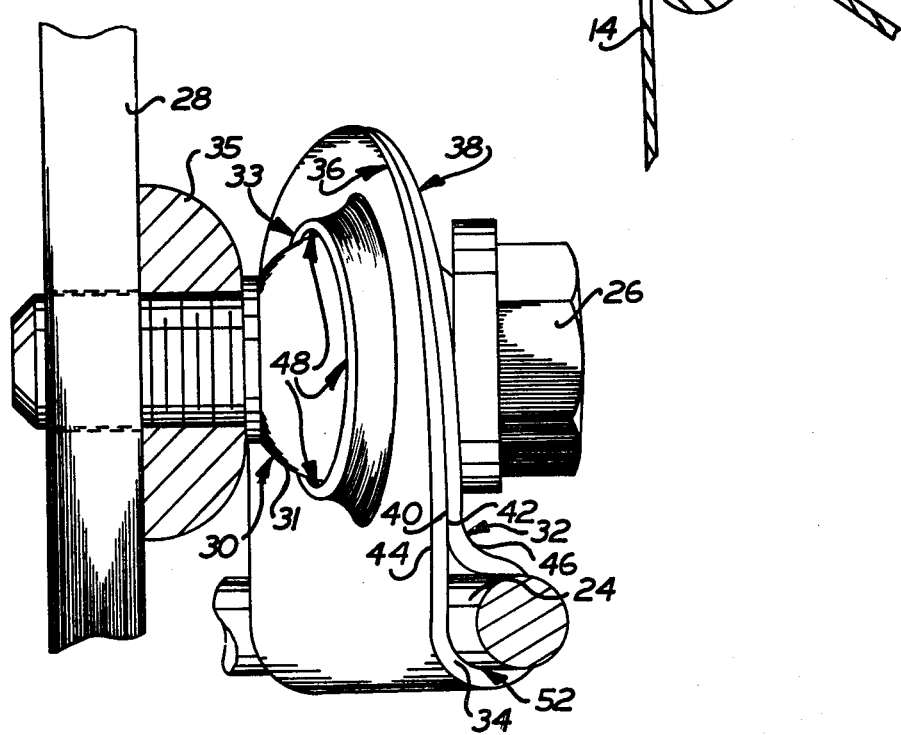
FIG. 2 is a pictorial side illustration of an anchorage system constructed in accordance with the principles of the invention.

The bearing portion 33 is formed generally centrally of the metal sheet portions 36, 38. As shown in FIGS. 2 and 3 the metal sheet portions 36, 38 have aligned openings 48, 50, and the sections of the metal sheet portions surrounding the openings 48, 50 are bent outwardly so that portions of the inner surfaces 40, 42 are generally spherically shaped conforming to the shape of the outer surface 31 of the bushing member 30. These portions of the inner surfaces provide substantial area contact with the bushing member 30 for providing substantial force transmitting characteristics between the anchor member 32 and the bushing (and thereby with the vehicle frame) in response to the transmission of forces to the anchor member 32.

As shown in FIGS. 2 and 3 the folded over metal sheet 34 forms a loop 52 which encircles a portion of the webbing relay 24. As is conventional in this art the webbing relay is restrained against movement relative to the loop 52 (such as by crimping the loop 52) and is therefore in substantial force transmitting relationship with the metal sheet 34.

When the occupant (or the retractor) exerts a force on the belt such as during an emergency condition, the belt transmits force to the webbing relay 24. Force is also transmitted from the webbing relay 24 to the metal anchor member (formed by the folded metal sheet 34), and to the bushing member 30 through engagement of the surfaces 40, 42 of sheet metal member 34 and bushing surface 31. Force in the bushing member 30 transmits force to bolt 26 and bolt 26 transmits force to the vehicle frame.

Thus, the foregoing description relates to an anchorage which is believed to be capable of transmitting substantial forces in a shoulder harness (or any comparable restraint member) to the vehicle frame, and yet in a manner which adjusts itself to the various complex angles and twists which the vehicle occupant may subject it to.

With the foregoing disclosures in mind, it is believed that numerous obvious modifications thereof will become apparent to those of ordinary skill in the art.

What is claimed is:

1. In a vehicle restraint system of the type in which a belt member extends upwardly from a first vehicle anchorage point to an upper vehicle anchorage point and then diagonally downwardly across the chest of a vehicle occupant to a lower anchorage point and where said first anchorage point comprises a belt retractor connected with said belt and having means urging said belt toward a retracted position, anchorage means at said upper anchorage point for engaging the belt member generally behind outwardly and above the occupant's outside shoulder for guiding the belt member over the occupant's shoulder and then diagonally downwardly toward said first anchorage point and for transmitting forces to the frame of the vehicle generally behind, outwardly of, and above the occupant's outside shoulder, said anchorage means comprising a ring member having an opening through which the belt member extends, an anchor member connected in force transmitting relationship with said ring member, said anchor member comprising a sheet metal member having a portion folded back upon itself to define first and second metal sheet portions with contiguous inner surface portions, said sheet metal member forming a loop surrounding a portion of said ring and being non-rotatably connected therewith, means for supporting said anchor member in force transmitting relationship with the frame of the vehicle comprising a bushing member fixedly connected with the frame of the vehicle, said bushing member having an outer surface portion forming a portion of a sphere, said inner surface portions of said first and second metal sheet portions of said anchor member extending generally outwardly and forming bearing surface means in the shape of a portion of a sphere disposed in surrounding relation with said outer surface portion of said bushing member for allowing said anchor member to move universally with respect to said bushing member to allow the diagonal portion of the shoulder belt to remain flat against the occupant's chest as the occupant's upper torso moves.

* * * * *